United States Patent [19]
Fukui et al.

[11] Patent Number: 5,694,218
[45] Date of Patent: Dec. 2, 1997

[54] OPTICAL ENCODER INCLUDING A PLURALITY OF PHASE ADJUSTING GRATINGS

[75] Inventors: Atsushi Fukui; Kanji Nishii; Kenji Takamoto; Masami Ito; Kazumasa Takata, all of Osaka-fu, Japan

[73] Assignee: Matsushita Electric Industrial Co., Ltd., Osaka, Japan

[21] Appl. No.: 643,433

[22] Filed: May 8, 1996

[30] Foreign Application Priority Data

May 8, 1995 [JP] Japan .................. 7-109405
May 2, 1996 [JP] Japan .................. 8-111678

[51] Int. Cl.[6] .................................. G01B 9/02
[52] U.S. Cl. ........................ 356/356; 250/237 G
[58] Field of Search ............ 356/356; 250/237 G, 250/231.13

[56] References Cited

U.S. PATENT DOCUMENTS 5,120,132  6/1992  Spies et al. ............... 356/356

FOREIGN PATENT DOCUMENTS 4420276  12/1994  Germany ................ 356/356
3-279812  12/1991  Japan .
1583735   8/1990  U.S.S.R. ................ 356/356

Primary Examiner—Samuel A. Turner
Attorney, Agent, or Firm—Wenderoth, Lind & Ponack

[57] ABSTRACT

An optical encoder has a light source and a diffracted light interference device including at least first and second diffraction gratings confronting each other, producing diffracted light beams in specific orders by passing light emitted from the light source through the first and second diffraction gratings, and making the diffracted light beams in the specific orders, which have passed through the diffraction gratings, interfere with each other to produce on-axis interference light beams in which the sum of the orders of the diffraction at the diffraction gratings is zero and off-axis interference light beams in which the sum of the orders of the diffraction is not zero. A phase device is adjusting the phases of the on-axis interference light beams and the off-axis interference light beams emitted from plural portions of the diffracted light interference device. A plurality of light sensors receive and detect the on-axis interference light beams and the off-axis interference light beams device. In this structure, since the on-axis interference light beams in which the sum of the orders of the diffraction at the diffraction gratings is zero and the off-axis interference light beams in which the sum of the orders of the diffraction is not zero are produced and the phases of the on-axis interference light beams and the phases of the off-axis interference light beams are made equal to each other, unwanted negation of signals is avoided, whereby the light utilization efficiency is increased.

9 Claims, 12 Drawing Sheets condensed beam spot Bs

OPTICAL ENCODER INCLUDING A PLURALITY OF PHASE ADJUSTING GRATINGS

FIELD OF THE INVENTION

The present invention relates to an optical encoder for converting a mechanical angle or a positional displacement into an electrical signal and, more particularly, to an optical encoder that produces an interference of diffracted light beams using two diffraction gratings and measures the intensity of the interfered light to observe movement, for example, rotation, of the diffraction gratings.

BACKGROUND OF THE INVENTION

When positioning is carried out in machinery, optical encoders, for example, photoelectric encoders, are widely used. A typical photoelectric encoder includes a rotatable plate and a fixed plate, these plates being located with a prescribed space between them and both having slits, and converts light that has passed through the slits into an electrical signal using a photodetector, whereby a straight-line length or a rotation angle is measured. In such a photoelectric encoder, the detection accuracy can be increased by reducing the pitch of the slits.

In this photoelectric encoder, however, if the pitch of the slits in the rotatable plate and the fixed plate is too short, the signal to noise ratio, i.e., S/N ratio, of an output signal from the photodetector is reduced due to the influence of diffracted light, resulting in a reduction in the detection accuracy.

On the other hand, when the pitch of the slits is increased to such an extent that the output signal from the photodetector is not adversely affected by the diffracted light, the diameter of the rotatable plate is inevitably increased, whereby the size of the encoder is increased. Consequently, a load applied to an apparatus driving the rotatable disk is increased.

Meanwhile, an interference fringe detection encoder utilizing diffracted light passing through diffraction gratings is also known as an optical encoder. The interference fringe detection encoder includes a fixed diffraction plate and a movable diffraction plate which are arranged approximately perpendicular to the optical axis, and converts interference fringes produced by diffraction and interference of light passing through these plates into electrical signals using a photodetector.

In the interference fringe detection encoder, however, since diffracted light beams in plural orders are emitted from the movable diffraction plate and the fixed diffraction plate, the intensity of diffracted light beams in specific orders required for the measurement is reduced, resulting in a reduction in the detection sensitivity.

Further, diffracted light beams in orders unnecessary for the measurement cause flare or ghost light, whereby the S/N ratio at the interference fringe detection is reduced.

Furthermore, when interference fringes produced by diffracted light beams that have passed through the movable diffraction plate and the fixed diffraction plate are detected by a photodetector, since a plurality of diffracted light beams in different orders, including a 0th order diffracted light beam, interfere with each other, the light intensity varies with a variation in the gap between the movable diffraction plate and the fixed diffraction plate. The allowable range for the gap variation is given by $2p^2/\lambda$ wherein p is the grating pitch and $\lambda$ is the wavelength of the measured light (refer to Optics and Laser Technology, 1955, pp.89–95).

Japanese Published Patent Application No. Hei. 3-279812 proposed an optical encoder detecting a stable signal against a wavelength variation of a light source and a gap variation between a movable diffraction plate and a fixed diffraction plate. This optical encoder is shown in FIG. 14.

The optical encoder shown in FIG. 14 comprises a coherent light source 130, a collimator lens 132 for converting light emitted from the coherent light source 130 to parallel light beams, a fixed diffraction plate 134, and a reflection type movable diffraction plate 136, which plates are arranged approximately perpendicular to the optical axis of the light emitted from the coherent light source 130, with an appropriate space between them, and have diffraction gratings of the same periodical pitch. Light emitted from the light source 130 and passing through the collimator lens 132 is diffracted by the first diffraction grating 134a on the fixed diffraction plate 134, resulting in a 0th order diffracted light beam and ±1st order diffracted light beams. These diffracted light beams are diffracted and reflected by the second diffraction gratings 136a on the movable diffraction plate 136 and again pass through the third diffraction gratings 134b and 134c on the fixed diffraction plate 134. Between two diffracted light beams intersecting at the third diffraction gratings 134b (134c), a light beam diffracted in the direction parallel to the light beam passing through the collimator lens 132 is detected by a photodetector 138A (138B).

In this optical encoder, however, since diffraction of light by the diffraction gratings is performed three times in total, the light utilization efficiency is reduced.

In addition, since all the 0th and ±1st order diffracted light beams are used, the diffraction efficiency must be made equal for the diffracted light beams in the respective orders. Therefore, when the diffraction efficiency is about 20%, the total light utilization efficiency is $(0.2)^3=0.008$, that is, about 0.01, which means that the available amount of light is only 1% or so. In this case, in order to increase the S/N ratio of an output signal, the output power of the coherent light source 130 must be increased.

Furthermore, as described above, the diffracted light beams in the unnecessary orders for the measurement cause flare or ghost light.

SUMMARY OF THE INVENTION

An object of the present invention is to provide an optical encoder having a simple structure, a high light utilization efficiency, and a high resolving power with respect to a grating pitch, and producing highly precise signals.

Other objects and advantages of the invention will become apparent from the detailed description that follows. The detailed description and specific embodiments described are provided only for illustration since various additions and modifications within the spirit and scope of the invention will be apparent to those of skill in the art from the detailed description.

According to a first aspect of the present invention, an optical encoder comprises a light source. A diffracted light interference means includes at least first and second diffraction gratings confronting each other, producing diffracted light beams in specific orders by passing light emitted from the light source through the first and second diffraction gratings, and making the diffracted light beams in the specific orders, which have passed through the diffraction gratings, interfere with each other to produce on-axis interference light beams in which the sum of the orders of the diffraction at the diffraction gratings is zero and off-axis interference light beams in which the sum of the orders of the diffraction is not zero. A phase adjusting means is for adjusting phases of the on-axis interference light beams and the off-axis interference light beams emitted from plural portions of the diffracted light interference means, and a plurality of light sensors receive and detect the on-axis interference light beams and the off-axis interference light beams emitted from the portions of the phase adjusting means and traveling toward the light sensors. In this structure, since the on-axis interference light beams in which the sum of the orders of the diffraction at the diffraction gratings is zero and the off-axis interference light beams in which the sum of the orders of the diffraction is not zero are produced and the phases of the on-axis interference light beams and the phases of the off-axis interference light beams are made equal to each other, unwanted negation of signals is avoided, whereby the light utilization efficiency is increased.

According to a second aspect of the present invention, in the above-described optical encoder, the diffracted light beams of specific orders produced by the first and second diffraction gratings are ±1st order diffracted light beams. Therefore, the on-axis interference light beams and the off-axis interference light beams are not adversely affected by higher order diffracted light beams, whereby a signal with reduced noise is obtained.

According to a third aspect of the present invention, in the above-described optical encoder, the phase adjusting means is constituted by dividing one of the first and second diffraction gratings into a plurality of diffraction grating portions and shifting the diffraction grating portions by ¼p (p: period of the diffraction grating portions) between adjacent diffraction grating portions; and the distance L between the light sensor and the divided diffraction grating is an integral multiple of {p×D/(2×N×λ)} wherein λ is the wavelength of the light source, p is the grating pitch of the diffraction grating portions, D is the total width of the diffraction grating divided into the diffraction grating portions, and N is the number of the diffraction grating portions (N: integer not less than 2). In this case, since the ¼ pitch shifting between the first and second diffraction gratings produces a signal change by ½ period, the signal phases of the on-axis interference light beams and the signal phases of the off-axis interference light beams which are incident on each light sensor are made equal to each other, whereby unwanted negation of signals on the light sensor is avoided. In addition, since the distance L between the diffraction grating and the light sensor is reduced, the size of the optical encoder can be reduced. Further, since two signals having phases ½ period different from each other are produced simultaneously, the S/N ratio can be increased with no increase in dark current in the light sensor, whereby highly precise detection of position or angle is realized. Furthermore, since the output power of the light source is reduced, the reliability of the encoder can be improved.

According to a fourth aspect of the present invention, in the above-described optical encoder, the light source emits approximately parallel light beams having a wavelength of λ. The first diffraction grating is a movable plate receiving the parallel light beams emitted from the light source, including a diffraction grating having a grating pitch of p, and moving in a direction approximately perpendicular to the optical axis. The second diffraction grating is a fixed plate disposed approximately parallel to the movable plate, including a plurality of diffraction gratings, each having a grating pitch of p, shifted by ¼p between adjacent diffraction gratings, and the light sensor comprises a plurality of light to electricity converters receiving light beams traveling through the fixed plate and the movable plate. Therefore, the structure of the optical encoder is simplified and the size of the optical encoder is reduced.

According to a fifth aspect of the present invention, in the above-described optical encoder, the diffraction gratings of the movable plate and the fixed plate are rectangular wave-shaped phase gratings and the depth d of the grooves of the phase gratings is given by $$d=(\tfrac{1}{2})\times\lambda\times(1+2m)\times(|n-n0|)$$

where m is 0, ±1, . . . , n is the refractive index of the diffraction gratings of the movable plate and the fixed plate, and n0 is the refractive index of a medium between the fixed plate and the movable plate. Therefore, diffracted light having principal light beams in ±1st order is obtained.

According to a sixth aspect of the present invention, in the above-described optical encoder, the light source emits approximately parallel light beams having a wavelength of λ. The first diffraction grating is a rotatable plate receiving the parallel light beams emitted from the light source, including a diffraction grating having a grating pitch of p, and rotating within a plane approximately perpendicular to the optical axis. The second diffraction grating is a fixed plate disposed approximately parallel to the movable plate, including a plurality of diffraction gratings, each having a grating pitch of p, shifted by ¼p between adjacent diffraction gratings. The light sensor comprises a plurality of light to electricity converters receiving light beams traveling through the fixed plate and the movable plate, and the optical encoder further includes means for generating a commutation signal for switching a coil current of a motor driving the rotatable plate. A means is provided for generating a rotation reference signal, which is a reference of the rotation of the rotatable plate. Therefore, an optical encoder for an AC servomotor is realized, and an angle signal of the rotatable plate, a rotation reference signal, and a signal for switching coil current of a motor for rotating the rotatable plate are produced.

According to a seventh aspect of the present invention, in the above-described optical encoder, the commutation signal generating means comprises a plurality of diffraction gratings disposed on the rotatable plate and receiving the light beams emitted from the light source. An aperture and a substantial light shielding part are disposed on the fixed plate receiving light beams emitted from the diffraction gratings on the rotatable plate, and a plurality of light to electricity converters are disposed on the light sensor, receiving light beams traveling through the aperture. Therefore, a commutation signal is easily produced in a simple structure.

According to an eighth aspect of the present invention, in the above-described optical encoder, the reference signal generating means comprises Fresnel zone plates disposed on the rotatable plate, receiving the light beams emitted from the light source, and forming condensed beam spots on the light sensor. A plurality of light to electricity converters are disposed on the light sensor at positions in the scanning locus of the condensed beam spots. Therefore, a rotation reference signal is easily produced in the simple structure using the Fresnel zone plates on the rotatable plate and the light to electricity converters on the light sensor.

DETAILED DESCRIPTION OF THE PREFERRED EMBODIMENTS

[Embodiment 1]

Figure 1:
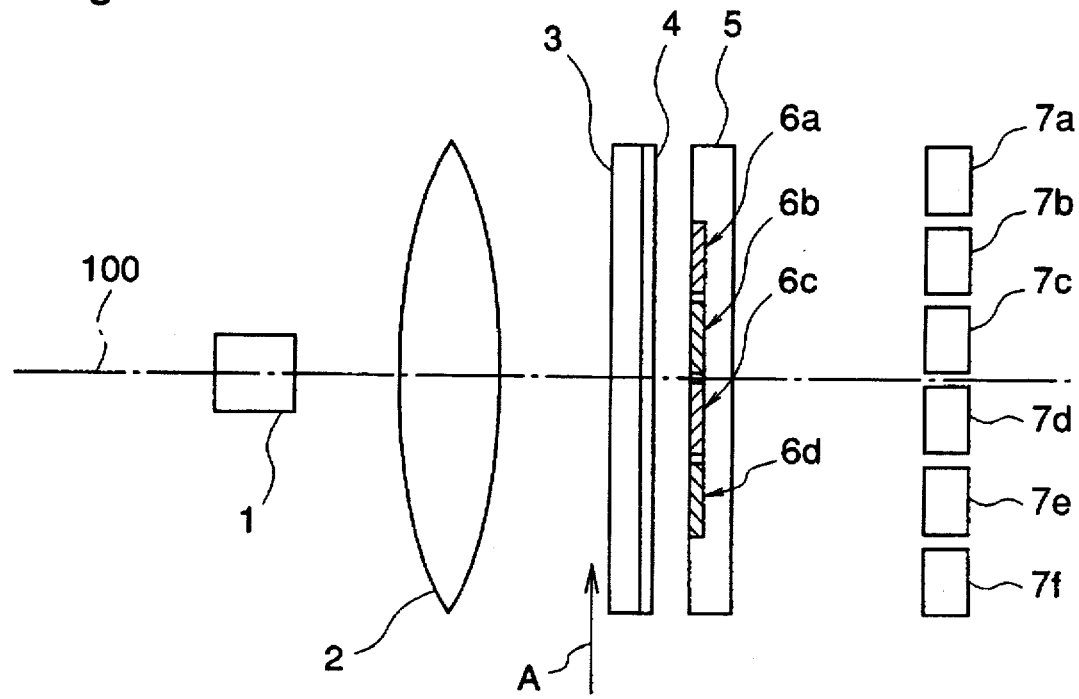
FIG. 1 is a side view illustrating an optical encoder in accordance with a first embodiment of the present invention.

An optical encoder in accordance with a first embodiment of the present invention will be described with reference to FIGS. 1 to 4. FIG. 1 is a side view illustrating a structure of an optical encoder according to the first embodiment. In FIG. 1, a light source 1 is located on an optical axis 100 of light emitted from a collimator lens 2 and on a forward focal point of the collimator lens 2. The light source 1 is a semiconductor laser, a light emitting diode, an electroluminescence, or the like, and the center wavelength of light emitted from the light source 1 is represented by $\lambda$. The collimator lens 2 converts light emitted from the light source 1 to parallel light beams. A movable plate 3 is located so that a first principal plane thereof is approximately perpendicular to the optical axis 100, and it is movable in a direction parallel to the first principal plane, i.e., in the direction approximately perpendicular to the optical axis 100. A diffraction grating 4 is disposed on a second principal plane of the movable plate 3, which is opposite to the first principal plane, and receives the parallel light beams from the collimator lens 2. The principal diffracted light beams of the diffraction grating 4 are ±1st order diffracted light beams. The pitch of the diffraction grating 4 is p, and the grating groove direction is perpendicular to the moving direction of the movable plate 3.

A fixed plate 5 is located so that a principal plane thereof is parallel to the principal plane of the movable plate 3, i.e., approximately perpendicular to the optical axis 100. On the principal plane of the fixed plate 5 facing the diffraction grating 4 on the movable plate 3, diffraction grating portions 6a, 6b, 6c, and 6d having the same width are disposed at center-to-center intervals of h. These diffraction grating portions 6a to 6d receive light beams output from the diffraction grating 4. The principal diffracted light beams of each of the diffraction grating portions 6a to 6d are ±1st order diffracted light beams. In addition, the grating pitches of these diffraction grating portions 6a to 6d are the same as the grating pitch p of the diffraction grating 4, and the grating groove directions thereof are the same as the grating groove direction of the diffraction grating 4. Further, the grating grooves are shifted by p/4 between adjacent diffraction grating portions.

Figure 17:
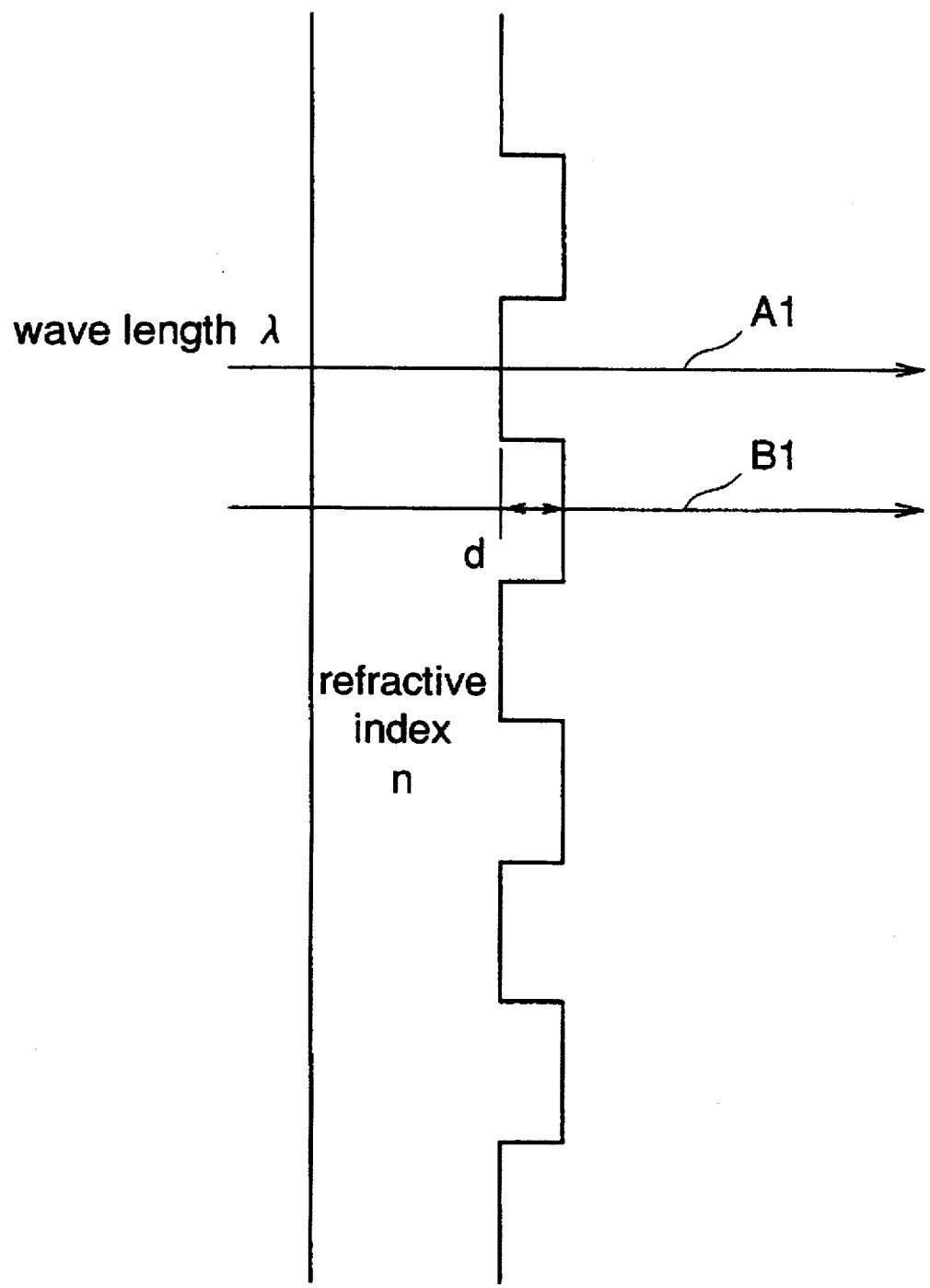
FIG. 17 is a diagram for explaining a groove depth d of a diffraction grating according to the first embodiment of the invention.

The cross-sectional configurations of the diffraction grating 4 and the diffraction grating portions 6a to 6d are rectangular, and the depth d of the grooves is given by $$d = (\tfrac{1}{2}) \times \lambda \times (1+2m) \times (1/|-n0|)$$

where m is 0, ±1, ..., n is the refractive index of the diffraction gratings of the movable plate and the fixed plate, n0 is the refractive index of a medium between the fixed plate and the movable plate, because, in FIG. 17, when a difference in optical path lengths between a light beam A1 having a wavelength $\lambda$ and a light beam B1 having a wavelength $\lambda$, i.e., (n−n0)d, is equal to ½$\lambda$ or a value obtained by adding an integral multiple of $\lambda$ to ½$\lambda$, this will be a condition for extinction of the 0th order diffracted light beam.

Photoelectric converters 7a, 7b, 7c, 7d, 7e, and 7f receive light beams emitted from the diffraction grating portions 6a to 6d and are located at a distance L from the diffraction grating portions 6a to 6d in the direction parallel to the optical axis 100 and arranged in the direction approximately perpendicular to the optical axis 100 at the center-to-center intervals of h. The distance L is equal to p×h/(2×$\lambda$).

Figure 2:
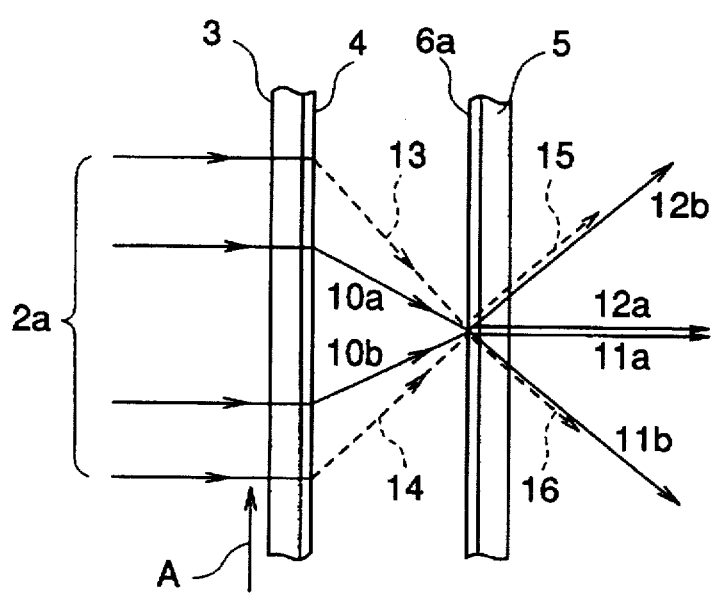
FIG. 2 is a diagram for explaining a principle of interference of diffracted light beams in the optical encoder according to the first embodiment of the invention.

A signal output produced by an interference of ±1st order diffracted light beams between two diffraction gratings in the optical encoder according to this first embodiment will be described with reference to FIGS. 2 and 3.

Initially, interference of diffracted light beams between the diffraction grating 4 and the diffraction grating 6a will be described. As shown in FIG. 2, a light beam 2a from the collimator lens 2 is diffracted at the diffraction grating 4, whereby a −1st order diffracted light beam 10a and a +1st order diffracted light beam 10b are produced. The diffraction angle of the ±1st order diffraction light beams 10a and 10b is given by $\theta = \sin^{-1}(\lambda/p)$ wherein p is the grating pitch of the diffraction grating. When the diffraction angle is sufficiently small, it can be approximated to $\theta = \lambda/p$.

The light beam 10a is again diffracted in the +1st order and the −1st order by the diffraction grating 6a, producing light beams 11a and 11b. Likewise, the light beam 10b is diffracted in the +1st order and the −1st order by the diffraction grating 6a, producing light beams 12a and 12b. Since the diffraction gratings 4 and 6a have the same grating pitch p as mentioned above, the diffraction angle at the diffraction grating 4 is equal to the diffraction angle at the diffraction grating 6a, so that the light beam 11a and the light beam 12a travel in the same optical path and an interference of these light beams 11a and 12a occurs.

It is well know that, when a diffraction grating moves, the phase of light diffracted in the moving direction leads, and the phase of light diffracted in the direction opposite to the moving direction delays. Therefore, when the movable plate 3 moves in the direction shown by the arrow A in FIG. 2, the phase of the light beam 10a delays and the phase of the light beam 10b leads.

As described above, when the light beams 10a and 10b are diffracted at the diffraction grating 6a, the light beams 11a and 11b and the light beams 12a and 12b are produced, respectively, and the light beams 11a and 12a travel in the same optical path, whereby interference occurs between the light beams 11b and 12a. At this time, if the movable plate 3 moves as mentioned above, the phase of light varies, so that the interference intensity varies. More specifically, when the movable plate 3 moves by one pitch (1p) of the diffraction grating 4, the phases of the light beams 11b and 12a vary each by one period. Therefore, the intensity of the interference light varies by two periods in response to the movement of the movable plate 3 by one pitch.

That is, the movement of the movable plate 3 can be detected from the variation in the amount of light. The same can be said of the relationship between the diffraction grating 4 and each of the diffraction gratings 6b, 6c, and 6d.

A description is now given of on-axis interference light and off-axis interference light.

Since the cross-sectional configurations of the diffraction grating 4 and the diffraction grating portions 6a to 6d are rectangular, the diffracted light includes 3rd order diffracted light besides the 1st order diffracted light. It is well known that the intensity of the 3rd order diffracted light is about 10% of the intensity of the 1st order diffracted light. When the diffraction gratings have the 3rd order components, a light beam 14 that is diffracted in the +3rd order by the movable plate 3 is further diffracted in the −1st order by the fixed plate 5, resulting in a light beam 15. Since this light beam 15 is in the same optical path as the light beam 12b, interference occurs between the light beam 15 and the light beam 12a. Likewise, a light beam 13 that is diffracted in the −3rd order by the movable plate 3 is further diffracted in the +1st order by the fixed plate 5, resulting in a light beam 16. Since this light beam 16 is in the same optical path as the light beam 11b, an interference occurs between the light beam 16 and the light beam 11a.

Hereinafter, the interference light produced by the light beams 11a and 12a is called on-axis interference light, and the interference light produced by the light beams 12b and 15 and the interference light produced by the light beams 11b and 16 are called off-axis interference light.

Figure 3:
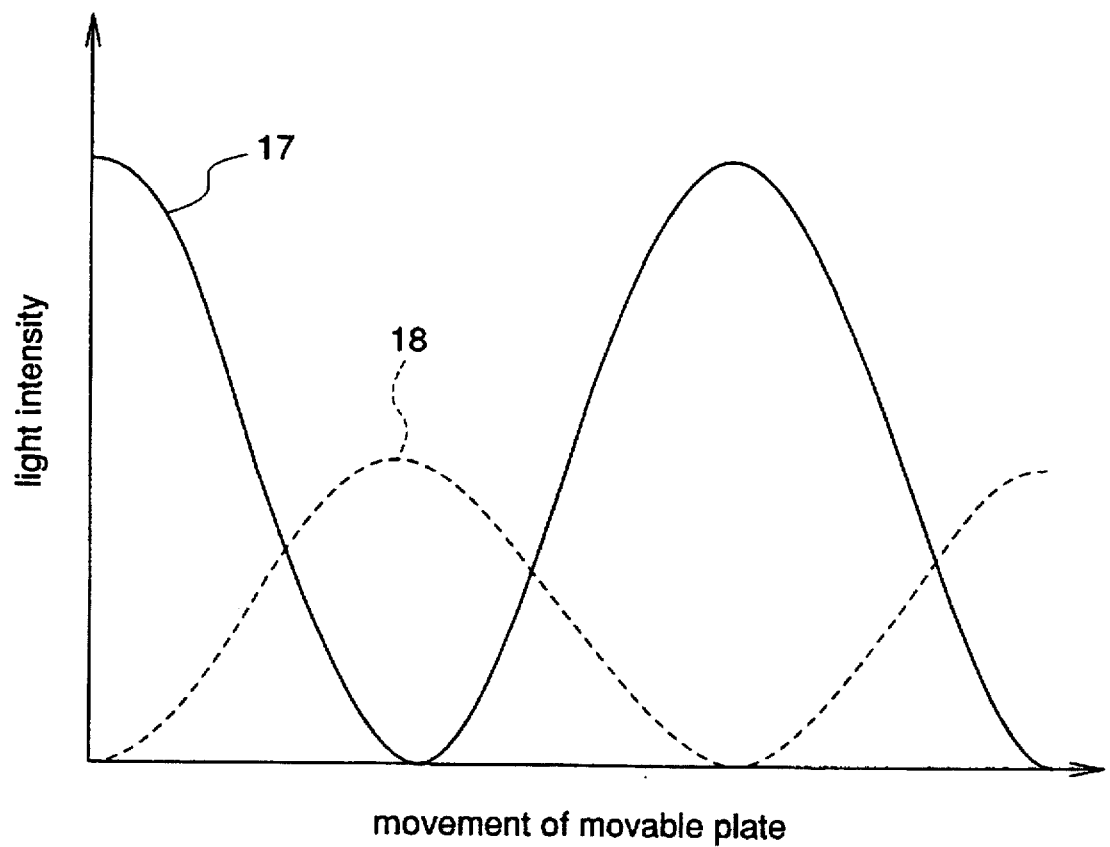
FIG. 3 is a diagram illustrating variations in light intensity with movement of a movable plate according to the first embodiment of the invention.

In FIG. 3, the intensity variation of the on-axis interference light is shown by characteristic curve 17, and the intensity variation of the off-axis interference light is shown by characteristic curve 18. As shown in FIG. 3, the intensity variation of the on-axis interference light is phase-shifted by ½ period from the intensity variation of the off-axis interference light.

Figure 15:
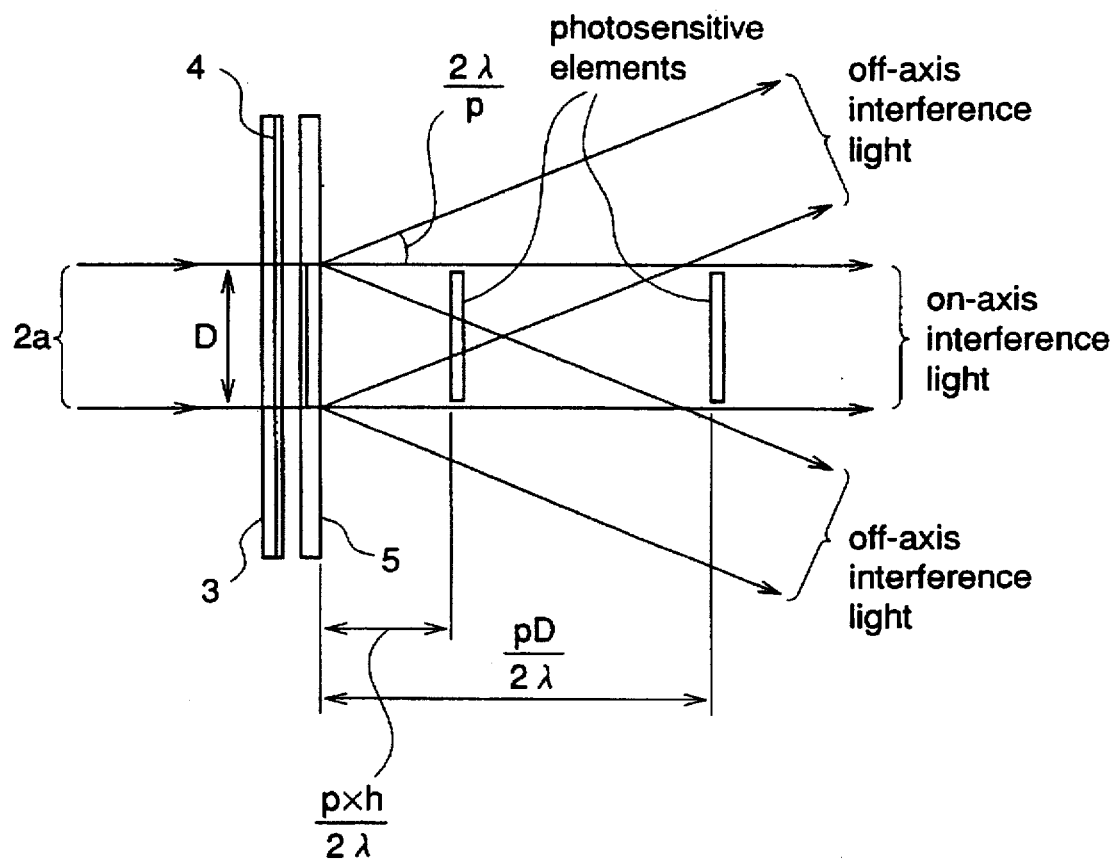
FIG. 15 is a schematic diagram illustrating the optical encoder according to the first embodiment of the invention.

Therefore, when a light sensor receives the on-axis interference light and the off-axis interference light simultaneously, negation of signals occurs. For example, in an optical encoder wherein a diffraction grating of a fixed plate is not divided into portions as shown in FIG. 15, when the distance L between the fixed plate and a light sensor is equal to p×h/(2×λ) as in this first embodiment, the off-axis interference light beams overlap the on-axis interference light beam, whereby unwanted negation of signals occurs, with the result that signals are hardly output from the light sensor. In order to avoid this problem, it is necessary to set the distance L between the fixed plate and the light sensor to L=p×D/(2×λ) and, in this case, the length of the device in the optical axis direction is increased.

Figure 16:
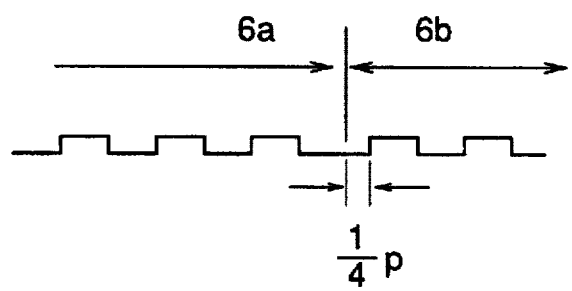
FIG. 16 is a diagram for explaining an operating principle of the optical encoder according to the first embodiment of the invention.

On the other hand, in the optical encoder according to the first embodiment of the invention, the diffraction grating of the fixed plate 5 is divided into a plurality of portions 6a to 6d, and the phases of the on-axis interference light beams and the phases of the off-axis interference light beams, which light beams are output from each of the grating portions 6a to 6d, are made equal to each other by adjusting the spacing between the grating portions, more specifically, by shifting the grating portions by ¼ pitch from each other as shown in FIG. 16, whereby the distance between the fixed plate and the light sensor is reduced. Therefore, even when the length of the device in the optical axis direction is reduced, the movement of the movable plate can be detected with high accuracy.

The above-mentioned principle and the detection of the movement of the movable plate 3 of the optical encoder according to this first embodiment of the invention will be described in more detail with reference to FIG. 4.

Figure 4:
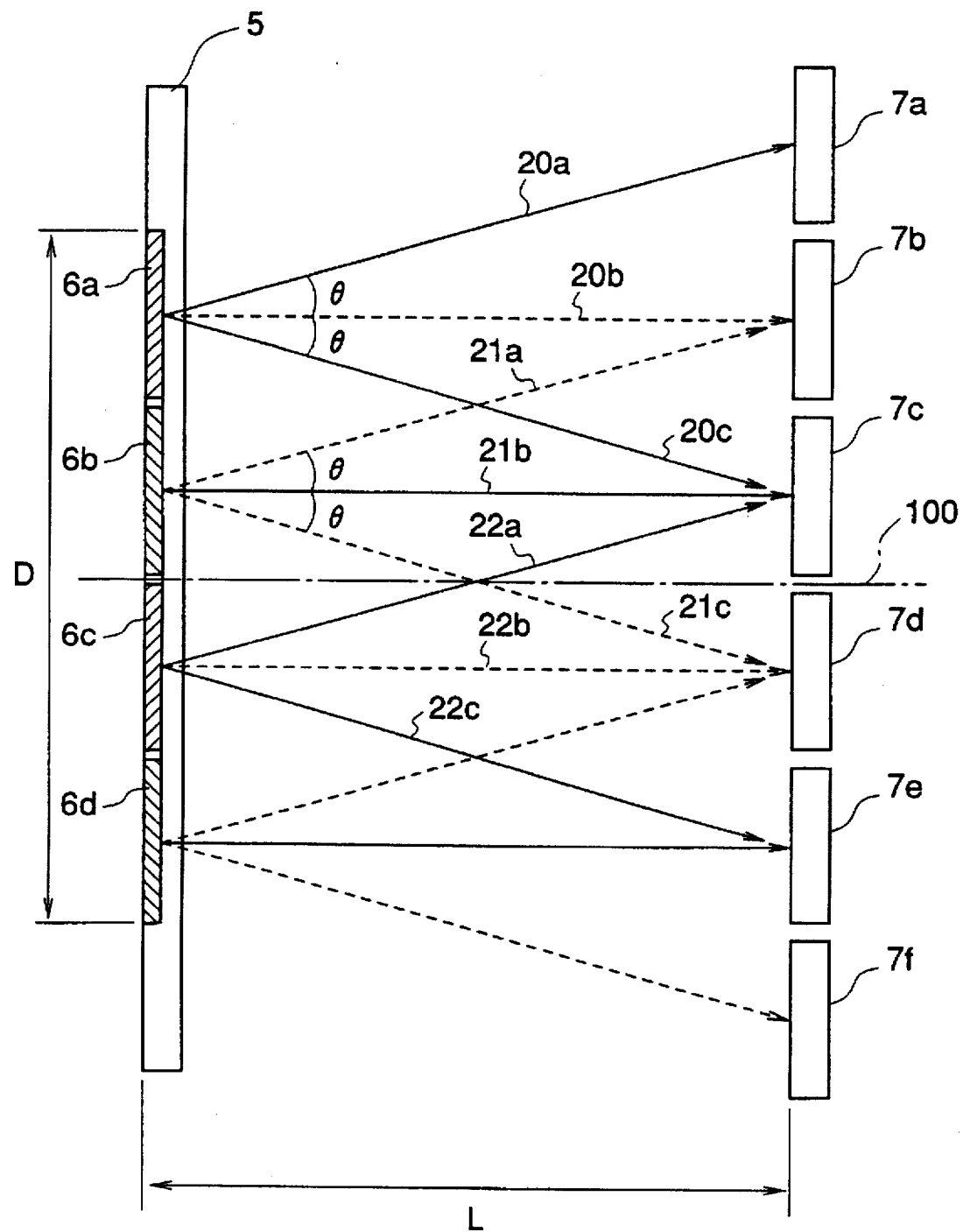
FIG. 4 is a diagram illustrating an optical path from diffraction gratings on a fixed plate to a light sensor according to the first embodiment of the invention.

FIG. 4 is a schematic diagram illustrating a structure from the fixed plate 5 to the light to electricity converters (light sensors) 7a to 7f, with optical paths of light beams emitted from the diffraction gratings 6a to 6d at the fixed plate 5.

In FIG. 4, light beams emitted from the diffraction grating 6a are denoted by 20a, 20b, and 20c. The light beam 20a travels in the direction of 2×λ/p with respect to the optical axis 100, the light beam 20b travels in the direction parallel to the optical axis 100, and the light beam 20c travels in the direction of −2×λ/p with respect to the optical axis 100. Since the distance L between the fixed plate 5 and the light to electricity converters 7a to 7f is given by L=p×h/(2×λ), the light beams 20a, 20b, and 20c are incident on the light to electricity converters 7b, 7a, and 7c, respectively. Likewise, light beams 21a, 21b, and 21c emitted from the diffraction grating 6b are incident on the light to electricity converters 7b, 7c, and 7d, respectively, and light beams 22a, 22b, and 22c emitted from the diffraction grating 6c are incident on the light to electricity converters 7c, 7d, and 7e, respectively.

In addition, the light beam 20b is an on-axis interference light beam and the light beams 20a and 20c are off-axis interference light beams, and the intensity variation of the on-axis interference light beam due to the movement of the movable plate 3 is shifted by ½ period from that of the off-axis interference light beam. Likewise, the light beams 21b and 22b are on-axis interference light beams, and the light beams 21a, 21c, 22a, and 22c are off-axis interference light beams.

In this optical encoder including two diffraction gratings and utilizing interference of ±1st order diffracted light beams, a signal change by 2 periods occurs in response to the movement of the diffraction grating by 1 pitch.

Since the diffraction gratings 6a and 6b are ¼ pitch shifted from each other as shown in FIG. 16, the signal change due to the on-axis interference light beam 20b is ½ period different from the signal change due to the on-axis interference light beam 21b. Likewise, since the diffraction gratings 6b and 6c are ¼ pitch shifted from each other, the signal change due to the on-axis interference light beam 21b is ½ period different from the signal change due to the on-axis interference light beam 22b.

When attention is given to the light to electricity converter 7c, the off-axis interference light beams 20c and 22a and the on-axis interference light beams 21b are incident on the light to electricity converter 7c. Although the signal change due to the on-axis interference light is ½ period different from the signal change due to the off-axis interference light, since the diffraction gratings 6a and 6b are ¼ pitch shifted from each other, the signal change due to the on-axis interference light beam 20b emitted from the diffraction grating 6a is ½ period different from the signal change due to the on-axis interference light beam 21b emitted from the diffraction grating 4b. Likewise, the signal change of the off-axis interference light beam 20a (20c) emitted from the diffraction grating 6a is ½ period different from the signal change of the off-axis interference light beam 21a (21c) emitted from the diffraction grating 6b. The same can be said of the on-axis interference light beams and the off-axis interference light beams emitted from the diffraction gratings 6b and 6c. Therefore, the signal changes due to the light beams incident on the light to electricity converter 7c are equal to each other, so that no negation of signals occurs. The same can be said of the light to electricity converters 7a, 7b, 7d, 7e, and 7f.

At this time, the distance L between the fixed plate 5 and the light to electricity converters 7a to 7f with respect to the width D of the diffraction grating of the fixed plate 5 is given by $$L = p \times h/(2 \times \lambda)$$

Since the space h (=D/N) between adjacent diffraction gratings is reduced with an increase in the number N of the divided diffraction grating portions of the diffraction grating of the fixed plate 5, the distance L can be reduced, as compared to the case where the diffraction grating of the fixed plate is not divided. When the diffraction grating of the fixed plate 5 is divided into four portions as in this first embodiment, the distance L between the fixed plate 5 and the light to electricity converters 7a to 7f can be reduced to one fourth as compared to the case where the diffraction grating is not divided.

Further, since output signals from the light to electricity converters 7b, 7d, and 7f have phases shifted by ½ period from those of the output signals from the light to electricity converters 7a, 7c, and 7e, respectively, because of the ¼ pitch shifting between the diffraction gratings 6a, 6b, 6c, and 6d, when differences between these signals are taken, signals with a high S/N ratio can be obtained.

According to this first embodiment of the invention, in the optical encoder utilizing an interference of diffracted light beams produced by two diffraction gratings, the diffraction grating on the fixed plate 5 is divided into small diffraction grating portions 6a to 6d, and the adjacent diffraction grating portions are shifted by p/4, whereby the distance L between the fixed plate 5 (diffraction grating) and the light to electricity converters 7a to 7f (light sensors) can be significantly reduced, resulting in a reduction in the size of the encoder. Further, since signals having phases ½ period different from each other are simultaneously obtained at each light sensor without a significant increase in the area of the light sensors, the light utilization efficiency can be significantly increased without an increase in dark current at the light sensors due to an increase in the area of the light sensors. As a result, the S/N ratio of signal is significantly increased, whereby highly precise detection of positions and angles is possible. Further, since the output power of the light source can be reduced, precision and reliability of the optical encoder are improved.

While in this first embodiment the diffraction grating of the fixed plate 5 is divided into four portions, i.e., fourth diffraction grating portions 6a to 6d are employed, the number of the division, i.e., the number of the diffraction grating portions, is not restricted thereto. That is, the diffraction grating may be divided into two portions, three portions, five portions, or more with the same effects as described above. In this case, the distance between the fixed plate and the light sensors is reduced to a value in reverse proportion to the number of the divided grating portions. That is, when the width of each grating portion is D and the number of the grating portions is N, the distance L between the fixed plate and the light sensors is given by $L = p \times D/(2 \times N \times \lambda)$ or an integral multiple thereof.

Furthermore, while in this first embodiment the cross-sectional configurations of the diffraction grating 4 and the diffraction grating portions 6a to 6d are rectangular, the configurations may be triangular, sine wave shaped, trapezoidal, or other configurations that provide ±1st order diffracted light beams as the principal diffracted light beams.

Furthermore, although the movable plate 3 and the fixed plate 5 are arranged in this order from the light source, this order may be reversed.

Furthermore, the movable plate 3 may be a rotatable plate having a diffraction grating on its periphery, and the fixed plate 5 may have a diffraction grating on its periphery.

[Embodiment 2]

An optical encoder according to a second embodiment of the present invention will be described with reference to FIGS. 5 to 13. This second embodiment relates to an optical encoder for an AC servomotor, generating an angle signal, a rotation reference signal, and a motor's coil current switching signal (hereinafter referred to as a CS signal). A means for generating the angle signal uses interference of diffracted light beams due to diffraction gratings on a rotatable plate and a fixed plate, a means for generating the rotation reference signal uses Fresnel zone plates on the rotatable plate and light to electricity converters, and a means for generating the CS signal uses change in light beam direction due to the diffraction grating on the rotatable plate.

Figure 5:
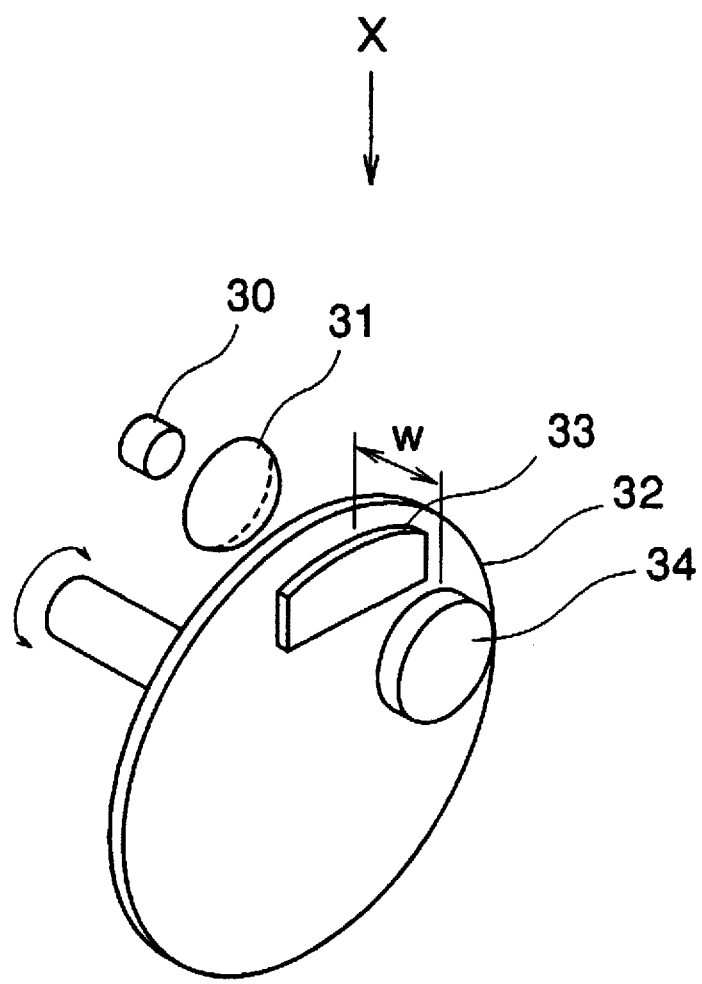
FIG. 5 is a perspective view illustrating an optical encoder according to a second embodiment of the invention.

FIG. 5 is a perspective view illustrating the optical encoder for an AC servomotor.

In FIG. 5, a light source 30 is a semiconductor laser, a light emitting diode, or the like, and emits light having a center wavelength of λ. The light source 30 is located on a forward focal point of a collimator lens 31, and light emitted from the light source 30 is converted to parallel light beams by the collimator lens 31. A rotatable plate 32 receives the light beams emitted from the collimator lens 31, and it is located so that a planar surface thereof is approximately perpendicular to the optical axis of the emitted light. On the rotatable plate 32, a first diffraction grating for producing an angle signal, Fresnel zone plates for producing a rotation reference signal, and a second diffraction grating for producing a CS signal are disposed, which are later described in more detail using FIG. 6.

A fixed plate 33 is located so that a planar surface thereof is approximately parallel to the planar surface of the rotatable plate 32, and receives light beams emitted from the rotatable plate 32. On the fixed plate 33, a diffraction grating for producing the angle signal and a substantial light shielding part for producing the CS signal are disposed, which are later described in more detail using FIG. 7. A light sensor 34 is located so that it receives light traveling through the rotatable plate 32 and the fixed plate 33. On the light sensor 34, light to electricity converters for producing the angle signal, the rotation reference signal, and the CS signal are disposed, which are later described in more detail using FIG. 8. The distance between the rotatable plate 33 and the light sensor 34 is denoted by w.

Figure 6:
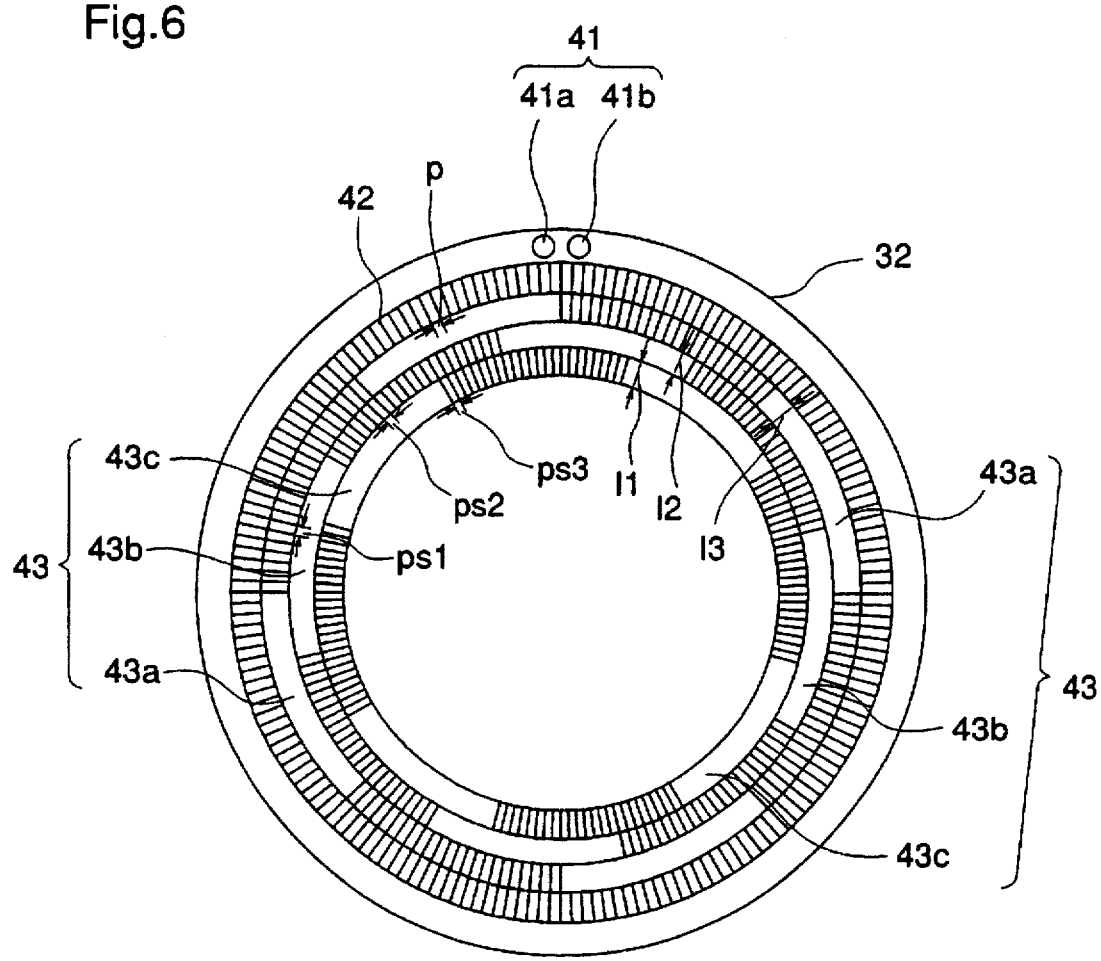
FIG. 6 is a diagram illustrating a pattern on a rotatable plate according to the second embodiment of the invention.

FIG. 6 shows a pattern of the rotatable plate 32. The rotatable plate 32 is equipped with minute light collecting elements 41a and 41b, such as Fresnel zone plates, for a rotation reference signal which is used as a reference of the rotation of the rotatable plate 32, a diffraction grating 42 for generating an angle signal, i.e., a rotation angle of the rotatable plate, and disposed on the periphery of the rotatable plate at the grating pitch of p, and a pattern 43 for generating a CS signal, i.e., a commutation signal for switching a coil current of an AC servomotor for rotating the rotatable plate 32. The groove direction (groove extending direction) of the diffraction grating 42 is the radial direction of the rotatable plate 32. In addition, the CS signal generating pattern 43 comprises three patterns 43a, 43b, and 43b having different phases in the radial direction, and these patterns 43a, 43b, and 43c correspond to three signals having phases shifted by 30° from each other, which signals are used for switching current of the coil of the AC servomotor. In the example shown in FIG. 6, each of these patterns 43a, 43b, and 43c includes diffraction gratings, principal diffracted light beams of which are ±1st order diffracted light beams, disposed at positions corresponding to every other 45° on the circumference of the rotatable plate 32. The groove direction of the diffraction gratings of the patterns 43a, 43b, and 43c is the radial direction of the rotatable plate 32, and the grating pitches of the patterns 43a, 43b, and 43c are denoted by ps1, ps2, and ps3, respectively.

Figure 7:
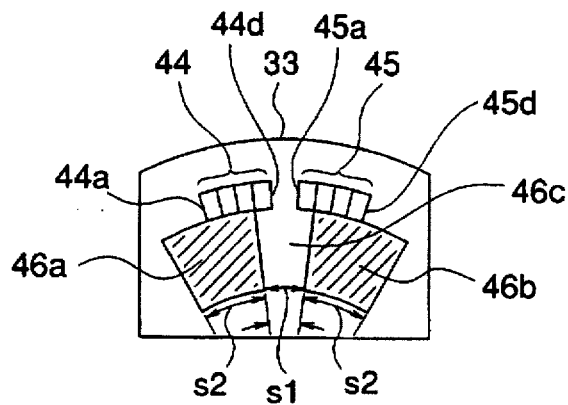
FIG. 7 is a diagram illustrating a pattern of a fixed plate according to the second embodiment of the invention.

FIG. 7 shows a pattern of the fixed plate 33. The fixed plate 33 is equipped with a diffraction grating 44 for generating a first angle signal, a diffraction grating 45 for generating a second angle signal, and two Fresnel zone plates 46a and 46b (a substantial light shielding part) for generating a CS signal. The diffraction gratings 44 and 45 are located so that the grating pitches of these diffraction gratings 44 and 45 are equal to the grating pitch p of the diffraction grating 42 of the rotatable plate 32 and the groove directions thereof are parallel to the groove direction of the diffraction grating 42. Further, the diffraction gratings 44 and 45 are ⅛ pitch shifted from each other in the circumference direction.

The Fresnel zone plates 46a and 46b prevent light beams from entering in light to electricity converters for producing a CS signal on the light sensor, i.e., it substantially functions as a light shielding part. The angle of the Fresnel zone plate 46a (46b) in the circumference direction is s2, and the angle of an aperture 46c between the Fresnel zone plates 46a and 46b is s1.

Figure 8:
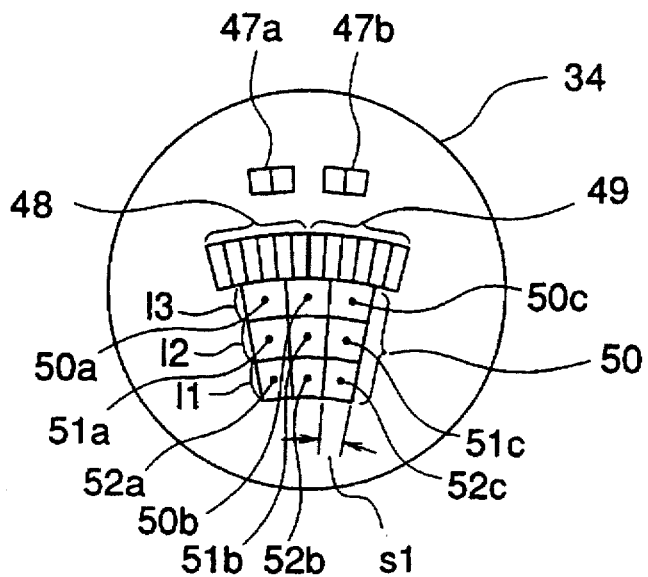
FIG. 8 is a diagram illustrating a pattern of a light sensor according to the second embodiment of the invention.

FIG. 8 shows a pattern of the light sensor 34. The light sensor 34 is equipped with light to electricity converters 47a and 47b, each being divided into two parts, (hereinafter referred to as binary light to electricity converters), a light to electricity converter group 48 for producing a first angle signal, a light to electricity converter group 49 for producing a second angle signal, and a light to electricity converter group 50 for producing a CS signal. The binary light to electricity converters 47a and 97b are disposed on the focal points of the Fresnel zone plates 41a and 41b of the rotatable plate 32, respectively. The distance between two light beams condensed by the Fresnel zone plates 41a and 41b, respectively, and the distance between the binary light to electricity converters 47a and 47b are decided according to the width of a pulse for generating the rotation reference signal. The light to electricity converter group 50 is divided into three in the radial direction and divided into three in the circumference direction, i.e., it comprises nine light to electricity converters 51a, 51b, 51c, 52a, 52b, 52c, 50c, 50b, and 50a, and the angle of each light to electricity converter in the circumference direction is s1. In addition, the distance from the rotation axis of the rotatable plate 32 to the light to electricity converters 50c, 50b, and 50a is r0, the distance from the rotation axis to the light to electricity converters 51c, 51b, and 51a is r1, and the distance from the rotation axis to the light to electricity converters 52c, 52b, and 52a is r2.

Further, with respect to the CS signal, the pitches ps1, ps2, and ps3 of the diffraction gratings 43a, 43b, and 43c are respectively given by ps1=λ×w/(s1×r0), ps2=λ×w/(s1×r1), and ps3=λ×w/(s1×r2), and spots of light beams 60 condensed by the Fresnel zone plates 46a and 46b are formed at positions spaced apart from each other by at least the angle s1 in the circumference direction.

The operation of the optical encoder for an AC servomotor shown in FIGS. 5 to 10 for detecting a rotation angle signal of the rotatable plate 32 is fundamentally identical to the operation for detecting the movement of the movable plate 3 already described with respect to the first embodiment of the invention. That is, when the structure according to this second embodiment shown in FIGS. 5 to 10 is compared with the structure according to the first embodiment shown in FIGS. 1 to 4, the light source 30 corresponds to the light source 1, the collimator lens 31 corresponds to the collimator lens 2, the rotatable plate 32 corresponds to the movable plate 3, the diffraction grating 42 corresponds to the diffraction grating 4, the diffraction grating 44 corresponds to the diffraction gratings 6a to 6d, and the light to electricity converter group 48 corresponds to the light to electricity converters 7a to 7f. Therefore, in this second embodiment, a description for the operation of detecting a rotation angle signal of the rotatable plate 32 is omitted.

Likewise, the detection of a second angle signal according to this second embodiment is similar to the detection of the movement of the movable plate according to the first embodiment. In this second embodiment, positions of the diffraction gratings 44 and 45 on the fixed plate 33 are ⅛ pitch shifted from each other. Since, as described in the first embodiment, a displacement of the diffraction grating by one pitch (1p) causes a signal change by two periods at the light sensor, the first angle signal and the second angle signal are detected as signals having phases ¼ period shifted from each other. The first and second angle signals are used as signals for detecting the rotating direction of the AC servomotor.

Figure 9:
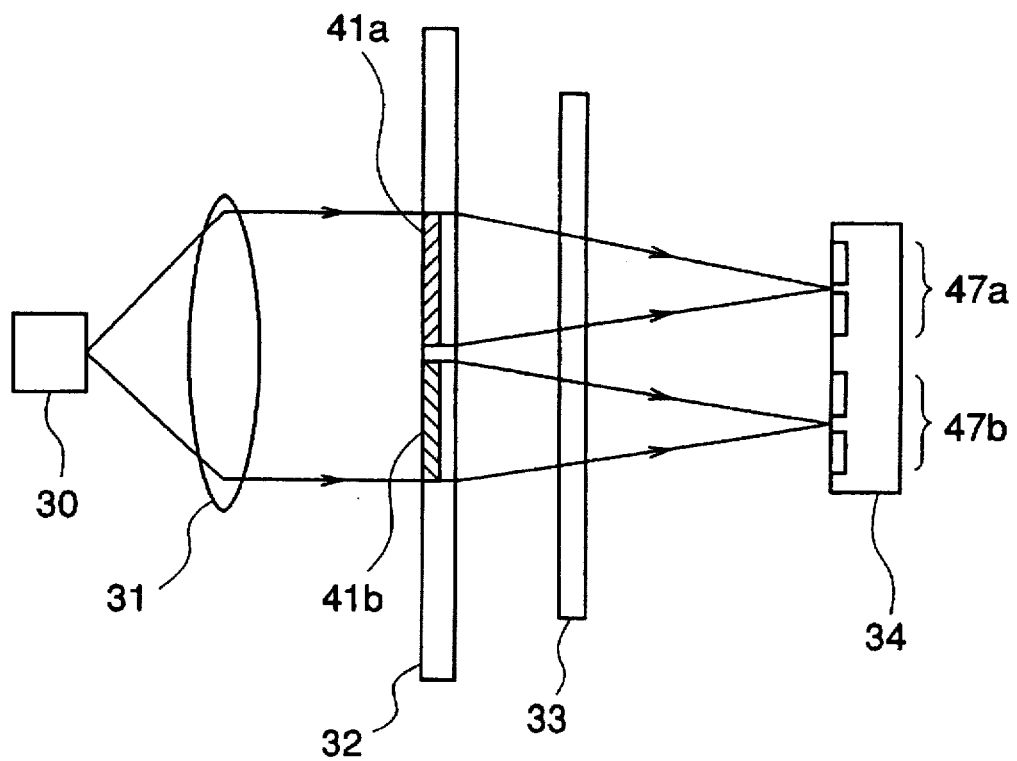
FIG. 9 is a side view illustrating a rotation reference signal generating section according to the second embodiment of the invention.

A description is now given of the rotation reference signal according to this second embodiment of the invention, with reference to FIG. 9. FIG. 9 is a schematic diagram illustrating the optical encoder according to this second embodiment viewed in the direction X in FIG. 5. Initially, light emitted from the light source 30 is converted to parallel light beams by the collimator lens 31 and applied to the rotatable plate 32. The light beams emitted from the collimator lens 31 is condensed by the Fresnel zone plates 41a and 41b on the rotatable plate 32 and focused on the light sensor 32, forming condensed beam spots. The condensed beam spots move across the binary light to electricity converters 47a and 47b with the rotation of the rotatable plate 32.

Figure 10:
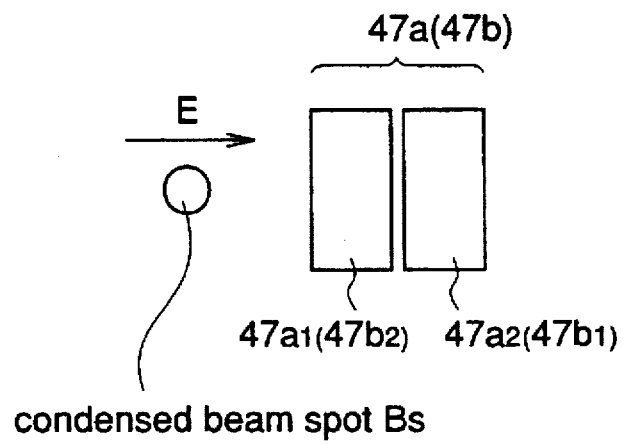
FIG. 10 is a schematic diagram illustrating the positional relationship between a condensed beam spot and a binary light to electricity converter in the rotation reference signal generating section according to the second embodiment of the invention.
Figure 11:
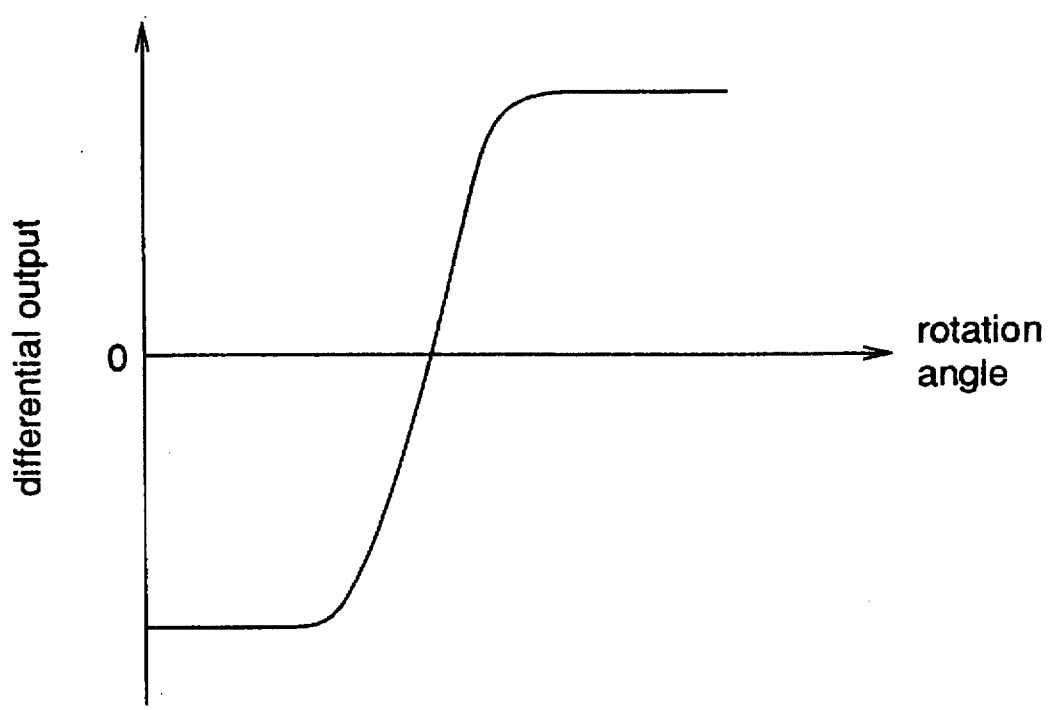
FIG. 11 is a diagram illustrating an output signal in the rotation reference signal generating section according to the second embodiment of the invention.

FIG. 10 shows the positional relationship between the condensed beam spot Bs and the binary light to electricity converter 47a in the rotation reference signal generating section according to this second embodiment of the invention. The binary light to electricity converter 47a comprises two light to electricity converters 47a1 and 47a2. When the condensed beam spot Bs moves across the binary light to electricity converter 47a in the direction shown by the arrow E in the figure, outputs from the light to electricity converters 47a1 and 47a2 vary in response to the position of the condensed beam spot Bs. A difference in outputs between the light to electricity converters 47a1 and 47a2 is shown in FIG. 11. The differential output becomes 0 when the condensed beam spot Bs is positioned just between the light to electricity converter 47a1 and the light to electricity converter 47a2. At this time, the change of the differential signal output in response to the rotation angle becomes the maximum. Therefore, by detecting a point at which the differential output passes the 0 level, highly precise detection of the angle is achieved. Likewise, using the Fresnel zone plate 41b and the binary light to electricity converter 47b, a highly precise detection of the position is achieved from a differential output between light to electricity converters 47b1 and 47b2 of the binary light to electricity converter 47b.

By setting the distance between the Fresnel zone plates 41a and 41b and the distance between the binary light to electricity converters 47a and 47b at prescribed values, a signal having a precise pulse width is obtained, which pulse width is represented by a period between the rotation angle detected by the Fresnel zone plate 41a and the binary light to electricity converter 47a and the rotation angle detected by the Fresnel zone plate 41b and the binary light to electricity converter 47b.

Next, the structure of the CS signal generating section and the operation for generating the CS signal will be described with reference to FIGS. 12 and 13. Hereinafter, a description is given of a CS signal obtained by the pattern 43a on the rotatable plate 32, the Fresnel zone plates 46a and 46b on the fixed plate 33, and the light to electricity converters 50a, 50b, and 50c.

Figure 12:
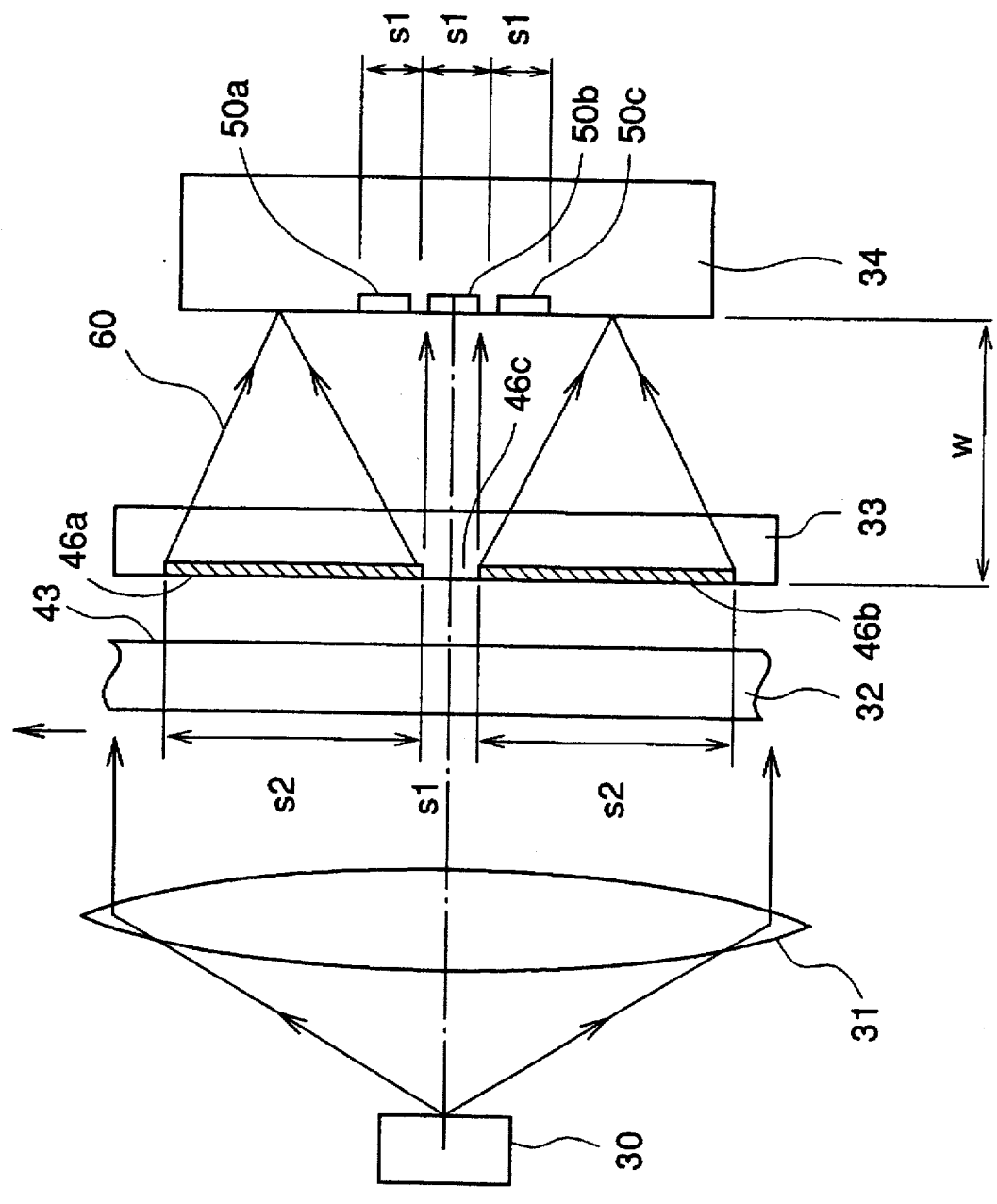
FIG. 12 is a side view illustrating a CS signal generating section according to the second embodiment of the invention.

FIG. 12 is a schematic diagram illustrating the optical encoder according to this second embodiment viewed in the direction X in FIG. 5. Initially, light emitted from the light source 30 is converted to parallel light beams by the collimator lens 31 and applied to the rotatable plate 32. The CS-phase pattern 43a on the rotatable plate 32 comprises portions with diffraction gratings and portions with no diffraction gratings. The optical encoder shown in FIG. 12 is in the state where a portion with no diffraction grating is in the optical path. A light beam passing through the portion of the pattern 43a with no diffraction grating travels through the aperture 46c between the Fresnel zone plates 46a and 46b and is incident on the central light to electricity converter 50b among the three light to electricity converters 50a, 50b, and 50c. On the other hand, light beams incident on the Fresnel zone plates 46a and 46b of the fixed plate 33 are focused on the light sensor at positions spaced apart from the light to electricity converters 50a, 50b, and 50c. Therefore, no light beam is incident on the light to electricity converters 50a and 50c.

Figure 13:
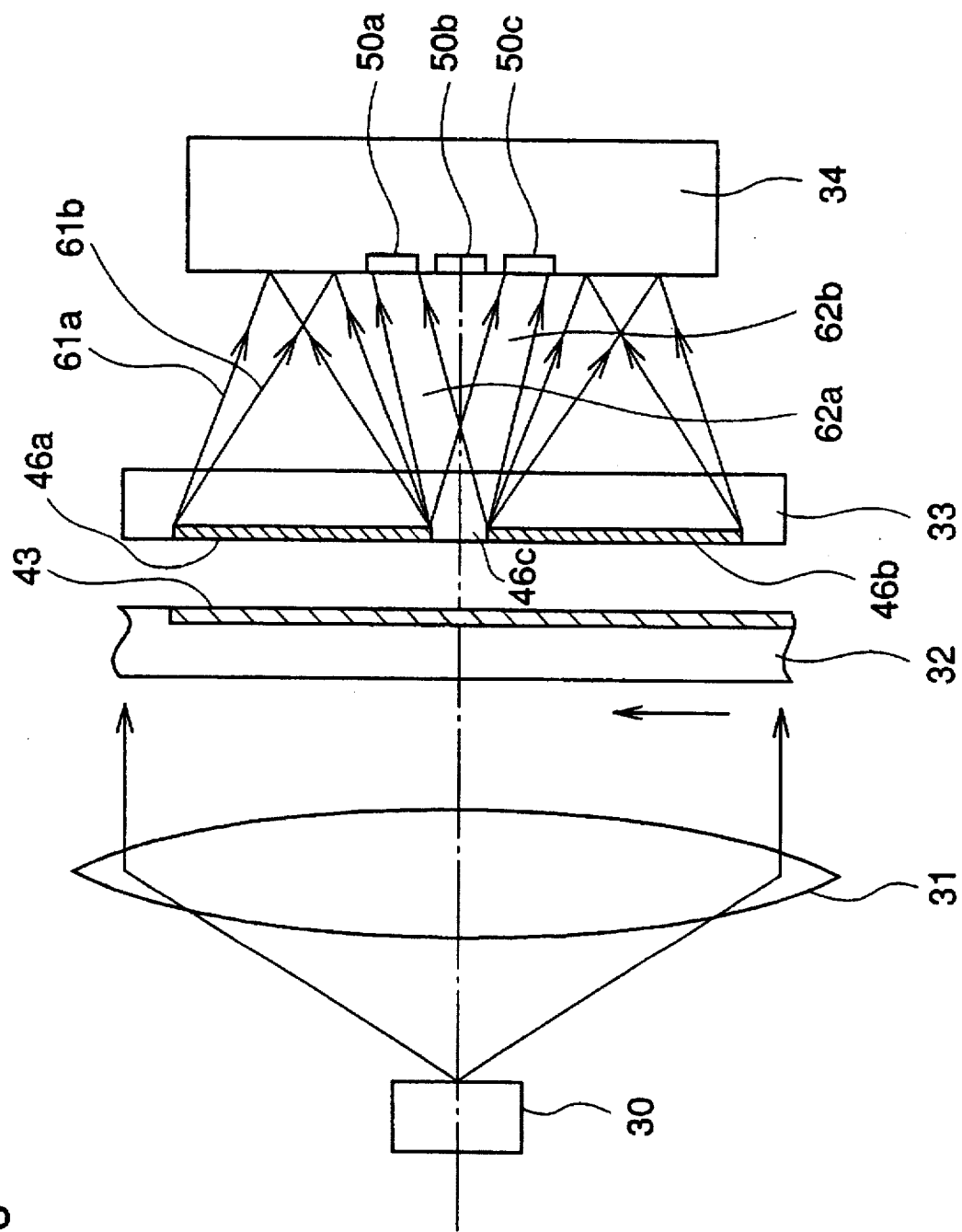
FIG. 13 is a side view illustrating a CS signal generating section according to the second embodiment of the invention.
Figure 14:
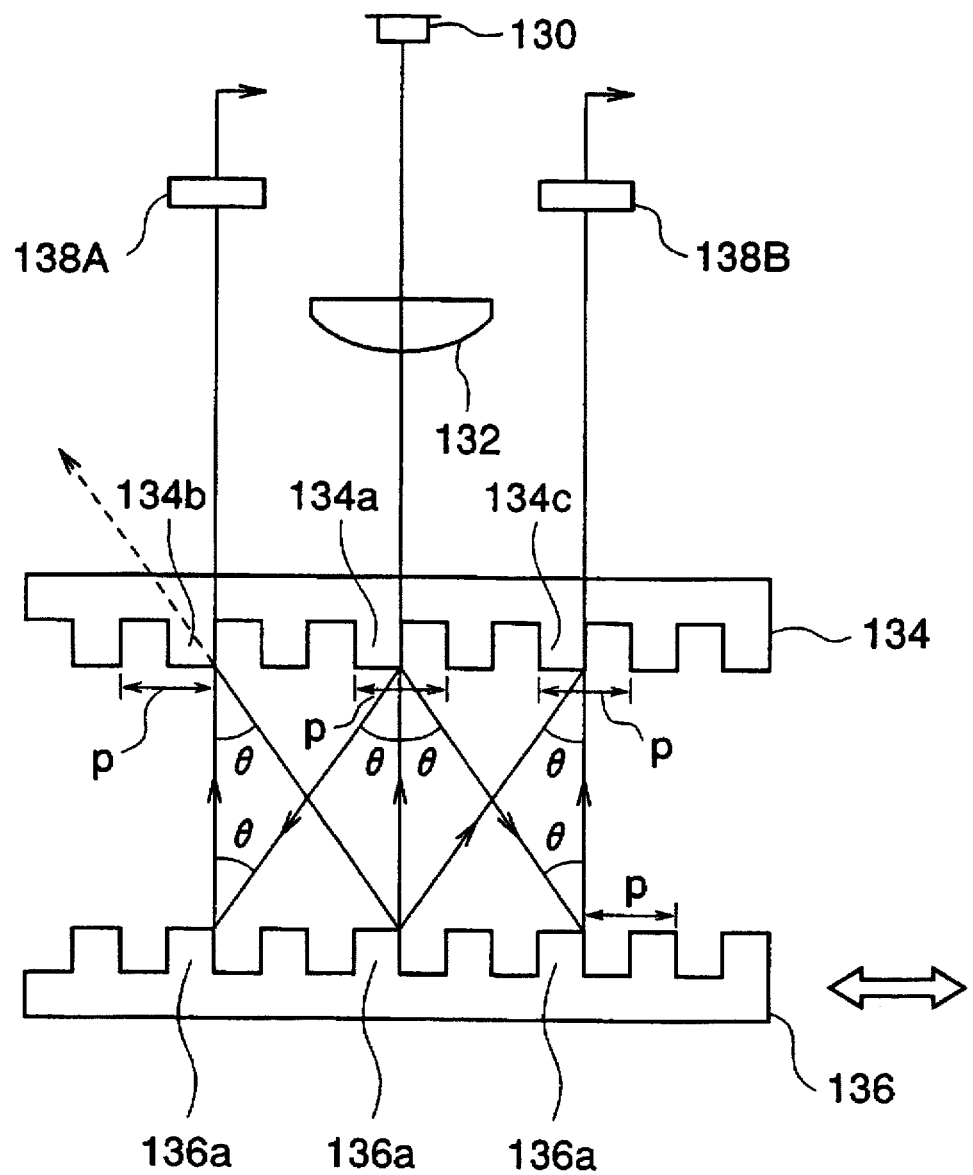
FIG. 14 is a schematic diagram illustrating a prior art optical encoder utilizing interference of diffracted light beams.

FIG. 13 shows the optical encoder in the state where the rotatable plate 32 rotates and a diffraction grating portion of the pattern 43 on the rotatable plate 32 is in the optical path. A light beam passing through the diffraction grating portion of the pattern 43 is converted to ±1st order diffracted light beams by the function of the diffraction grating. The ±1st order diffracted light beams traveling through the aperture 46c between the Fresnel zone plates 46a and 46b, i.e., light beams 62a and 62b, are incident on the light to electricity converters 50a and 50c of the light sensor 34, respectively.

On the other hand, a light beam incident on the Fresnel zone plate 46a (46b) of the fixed plate 33 produces two light beams 61a and 61b. Because of the diffraction grating portion of the pattern 43, the optical paths of the two light beams 61a and 61b emitted from the Fresnel zone plate 46a (46b) are deviated in direction by $\pm\lambda/ps1$ from those provided in the optical encoder in the state shown in FIG. 12. Thereby, the focal point of the light beam 61b on the light sensor 34 approaches the light to electricity converters 50a, 50b, and 50c by $\pm\lambda/ps1$. Since ps1 is equal to $\lambda\times w/(s1\times r0)$, the focal point approaches by $s1\times r0$ which is equal to $s1$ when converted to an angle.

However, when the diffraction grating portion of the pattern 43 is not in the optical path as shown in FIG. 12, since the focal points produced by the Fresnel zone plates 46a and 46b are spaced apart from the light to electricity converters 50a, 50b, and 50c by at least the angle $s1$ as mentioned above, the light beams 61a and 61b are never incident on the light to electricity converter group 50.

In this way, output signals are obtained from the light to electricity converter group 50 of the light sensor 34 in response to the diffraction grating pattern 43 on the rotatable plate 32. Since a signal output from the light to electricity converter 50a (50c) is different in phase by ½ period from a signal output from the light to electricity converter 50b, when a difference in the output signals between the light to electricity converters 50a (50c) and 50b is detected with the 0 level as a reference, a highly precise detection of angle is achieved without being influenced by the intensity of the light source 30. The same can be said of the remaining two CS signals.

As described above, according to the second embodiment of the invention, detection of an angle signal is performed on the basis of a principle similar to the principle of the first embodiment by utilizing interference of diffracted light beams produced by the two diffraction gratings 42 and 44 disposed on the rotatable plate 32 and the fixed plate 33, respectively, dividing the diffraction grating 44 on the fixed plate 33 into small diffraction grating portions 44a to 44d, and shifting the positions of the diffraction grating portions 44a to 44d by p/4 from each other, whereby the same effects as those provided by the first embodiment are achieved. Further, two signals having phases shifted by ¼ period from each other are obtained by the diffraction gratings 44 and 45 on the fixed plate 33 which are ⅛ pitch shifted from each other, whereby the rotating direction of the rotatable plate is detected. Furthermore, a highly precise rotation reference signal is produced by the minute light collecting elements 41a and 41b on the rotatable plate 32 and the binary light to electricity converters 47a and 47b. Furthermore, a highly precise detection of a CS signal having a period longer than that of the angle signal is performed by the CS signal detecting diffraction grating patterns 43a, 43b, and 43c on the rotatable plate 32 and the Fresnel zone plates 46a and 46b on the fixed plate 33.

Furthermore, since the respective patterns on the rotatable plate 32 and the fixed plate 33 for generating the angle signal, the rotation reference signal, and the CS signal are formed using irregularity, i.e., concave and convex, on a transparent plate, these patterns can be formed in a stamper process, whereby a mass production and a reduction in cost are expected.

In the second embodiment of the invention, on the rotatable plate 32, the Fresnel zone plates 41 for generating the rotation reference signal, the diffraction grating 42 for generating the angle signal, and the diffraction grating pattern 43 for generating the CS signal are disposed in this order from the periphery of the rotatable plate 32. However, this order may be changed to, for example, the diffraction grating 42 for generating the angle signal, the diffraction grating pattern 43 for generating the CS signal, and the Fresnel zone plates 41 for generating the rotation reference signal from the periphery of the rotatable plate 32. Also in this case, the same effects as provided by the second embodiment are obtained.

Further, although the pattern for the first angle signal and the pattern for the second angle signal are disposed at the same radial position, these patterns may be disposed on different radial positions.

Further, although the diffraction grating 44 (45) on the fixed plate 33 is divided into four portions, it may be divided into two portions, three portions, five portions, or more with the same effects as described above. In this case, the distance between the diffraction grating and the light sensor is reduced to a value in reverse proportion to the number of the divided grating portions. That is, when the width of the diffraction grating on the fixed plate is D and the number of the divided grating portions is N, the distance L between the fixed plate and the light sensor is given by L=p×D/(2×N×λ) or an integral multiple thereof, where N is an integer not less than 2.

Furthermore, in the detection of the rotation reference signal, an origin position may be detected using one Fresnel zone plate on the rotatable plate 32.

In the second embodiment of the invention, as a substantial light shielding part on the fixed plate for generating the CS signal, a Fresnel zone plate is employed and light beams incident on the Fresnel zone plate are focused on a region of the light sensor where the light to electricity converters are not present. However, in place of the Fresnel zone plate, a convex lens may be employed, or a light shielding part may be formed by vapor deposition of aluminum. In addition, photodiodes or phototransistors may be employed as the light to electricity converters of the light sensor, and a CCD may be employed as the light sensor.

Although the rotatable plate 32 and the fixed plate 33 are arranged in this order from the light source 30, this order may be reversed. Further, although the patterns for the angle signal, the rotation reference signal, and the CS signal are disposed on the confronting surfaces of the rotatable plate 32 and the fixed plate 33, these patterns may be disposed on the opposite surfaces.

Furthermore, in this second embodiment, for an eight pole motor, each of the patterns 43a, 43b, and 43c on the rotatable plate 32 has diffraction grating portions and portions without diffraction gratings at every other 45° on the circumference of the rotatable plate 32. However, the diffraction grating portions and the portions without diffraction gratings may be disposed at every other 360/N degrees for an N pole motor (N: integer not less than 2).

Furthermore, in the CS signal generating means, the diffraction order of the diffraction grating of the pattern 43 on the rotatable plate 32 is +1st order and −1st order, and the light to electricity converter group 50 on the light sensor 34 is divided into three in the circumference direction. However, a blazed diffraction grating having a saw tooth-shaped cross section may be employed as the diffraction grating of the pattern 43 and, in this case, the diffraction order of the grating is only +1st order or only −1st order, and the light to electricity converter group 50 is divided into two. Further, in the CS signal generating means, although the aperture 46c is provided between the Fresnel zone plates 46a and 46b on the fixed plate 33, a lens or a Fresnel zone plate may be disposed on the portion between the Fresnel zone plates 46 and 46b to form a condensed beam spot on the light sensor.

What is claimed is:

1. An optical encoder comprising:
a light source;
diffracted light interference means, including at least first and second diffraction gratings confronting each other, for producing diffracted light beams in specific orders by passing light emitted from the light source through the first and second diffraction gratings, and making the diffracted light beams in the specific orders, which have passed through the diffraction gratings, interfere with each other to produce on-axis interference light beams in which the sum of the orders of the diffraction at the diffraction gratings is zero and off-axis interference light beams in which the sum of the orders of the diffraction is not zero;
phase adjusting means for adjusting phases of the on-axis interference light beams and the off-axis interference light beams emitted from plural portions of the diffracted light interference means; and
a plurality of light sensors receiving and detecting the on-axis interference light beams and the off-axis interference light beams emitted from the portions of the phase adjusting means and traveling toward the light sensors.

2. The optical encoder of claim 1 wherein the diffracted light beams of specific orders produced by the first and second diffraction gratings are ±1st order diffracted light beams.

3. The optical encoder of claim 2 wherein the phase adjusting means is constituted by dividing one of the first and second diffraction gratings into a plurality of diffraction grating portions and shifting the diffraction grating portions by ¼p (p: period of the diffraction grating portions) between adjacent diffraction grating portions; and
the distance L between the light sensor and the divided diffraction grating is an integral multiple of $$\{p \times D/(2 \times N \times \lambda)\}$$

wherein λ is the wavelength of the light source, p is the grating pitch of the diffraction grating portions, D is the total width of the diffraction grating divided into the diffraction grating portions, and N is the number of the diffraction grating portions (N: integer not less than 2).

4. The optical encoder of claim 3 wherein the light source emits approximately parallel light beams having a wavelength of λ;
the first diffraction grating is a movable plate receiving the parallel light beams emitted from the light source, including a diffraction grating having a grating pitch of p, and moving in a direction approximately perpendicular to the optical axis;
the second diffraction grating is a fixed plate disposed approximately parallel to the movable plate, including a plurality of diffraction gratings, each having a grating pitch of p, shifted by ¼p between adjacent diffraction gratings; and
the light sensor comprises a plurality of light to electricity converters receiving light beams traveling through the fixed plate and the movable plate.

5. The optical encoder of claim 4 wherein the diffraction gratings of the movable plate and the fixed plate are rectangular wave shaped phase gratings and the depth d of the grooves of the phase gratings is given by $$d = (\frac{1}{2}) \times \lambda \times (1+2m) \times (n-n0)$$

where m is 0, ±1, . . . , n is the refractive index of the diffraction gratings of the movable plate and the fixed plate, and n0 is the refractive index of a medium between the fixed plate and the movable plate.

6. The optical encoder of claim 4 wherein the light source emits approximately parallel light beams having a wavelength of λ;

the first diffraction grating is a rotatable plate receiving the parallel light beams emitted from the light source, including a diffraction grating having a grating pitch of p, and rotating within a plane approximately perpendicular to the optical axis;

the second diffraction grating is a fixed plate disposed approximately parallel to the movable plate, including a plurality of diffraction gratings, each having a grating pitch of p, shifted by ¼p between adjacent diffraction gratings;

the light sensor comprising a plurality of light to electricity converters receiving light beams traveling through the fixed plate and the movable plate; and the optical encoder further including:

means for generating a commutation signal for switching a coil current of a motor driving the rotatable plate; and means for generating a rotation reference signal which is a reference of the rotation of the rotatable plate.

7. The optical encoder of claim 6 wherein the commutation signal generating means comprises:

a plurality of diffraction gratings disposed on the rotatable plate and receiving the light beams emitted from the light source;

an aperture and a substantial light shielding part disposed on the fixed plate and receiving light beams emitted from the diffraction gratings on the rotatable plate; and a plurality of light to electricity converters disposed on the light sensor and receiving light beams traveling through the aperture.

8. The optical encoder of claim 6 wherein the reference signal generating means comprises:

Fresnel zone plates disposed on the rotatable plate, receiving the light beams emitted from the light source, and forming condensed beam spots on the light sensor; and a plurality of light to electricity converters disposed on the light sensor at positions in the scanning locus of the condensed beam spots.

9. The optical encoder of claim 7 wherein the reference signal generating means comprises:

Fresnel zone plates disposed on the rotatable plate, receiving the light beams emitted from the light source, and forming condensed beam spots on the light sensor; and a plurality of light to electricity converters disposed on the light sensor at positions in the scanning locus of the condensed beam spots.

* * * * *